United States Patent [19]

O'Leary et al.

[11] Patent Number: 5,708,899
[45] Date of Patent: Jan. 13, 1998

[54] MULTIPLE SWITCHES FOR ELIMINATION OF CAMERA FAILURE MODES

[75] Inventors: Beth Andrews O'Leary, Rochester; J. David Cocca, Pittsford; Anthony DiRisio, Rochester, all of N.Y.

[73] Assignee: Eastman Kodak Company, Rochester, N.Y.

[21] Appl. No.: 469,241

[22] Filed: Jun. 6, 1995

[51] Int. Cl.$^6$ ................................................ G03B 17/02
[52] U.S. Cl. ........................................ 396/536; 396/538
[58] Field of Search ............................ 354/21, 288, 215; 396/392, 536, 538, 284

[56] References Cited

U.S. PATENT DOCUMENTS

| | | | |
|---|---|---|---|
| 4,816,852 | 3/1989 | Kimura | 354/173.1 |
| 4,903,053 | 2/1990 | Harvey | 354/21 |
| 4,939,531 | 7/1990 | Sawamura et al. | 354/173.1 |
| 4,994,833 | 2/1991 | Cocca | 354/207 |
| 5,159,365 | 10/1992 | Takahashi et al. | 354/21 |
| 5,235,365 | 8/1993 | Takatori et al. | 354/173.11 |
| 5,255,034 | 10/1993 | Shimada et al. | 354/173.1 |
| 5,287,136 | 2/1994 | Kitagawa et al. | 354/173.1 |
| 5,296,887 | 3/1994 | Zander | 354/275 |
| 5,317,355 | 5/1994 | Zander et al. | 354/277 |
| 5,347,335 | 9/1994 | Misawa | 354/288 |
| 5,463,435 | 10/1995 | Ezawa | 354/21 |
| 5,526,084 | 6/1996 | Kataoka et al. | 354/275 |

*Primary Examiner*—Safet Metjahic
*Assistant Examiner*—John Chizmar
*Attorney, Agent, or Firm*—Roger A. Fields; Jeff Rothenberg

[57] ABSTRACT

A camera is provided that includes a door which is selectively movable between an open position and a closed position and a release which is movable between a home position and an away position for selectively retaining said door in said closed position. Door position, release position and film sensors each have at least two states for determining the position of the door and release and for determining presence of film in the camera. The sensors are disposed within an electric circuit for allowing operation of the camera as a function of the states of the sensors. The release is selectively displaceable from the home position for retaining the door, to the away position for releasing the door and the camera is operable only when the door position sensor is disposed in a state corresponding to the door being closed, the release position sensor is disposed in a state corresponding to said release being in the home position and the film sensor is disposed in a state corresponding to film being present in the camera. A film position sensor determines whether film is disposed in a film plane of the camera and maintains operation of the camera uninterrupted by the electric circuit as long as the film position sensor indicates that film is disposed in the film plane.

17 Claims, 14 Drawing Sheets

MULTIPLE SWITCHES FOR ELIMINATION OF CAMERA FAILURE MODES

CROSS REFERENCE TO RELATED APPLICATION

Reference is made to commonly assigned co-pending applications Ser. No. 386,792, entitled DOUBLE EXPOSURE PREVENTION APPARATUS FOR CAMERAS USING THRUST TYPE FILM CARTRIDGES; Ser. No. 385,291, entitled DOUBLE EXPOSURE PREVENTION APPARATUS; and Ser. No. 08/565,463, entitled YOKE DRIVE FOR ALL DOOR, all assigned to the assignee of this application and all of which are hereby incorporated by reference into the present application.

DESCRIPTION

1. Field of the Invention

This invention relates to photographic systems that use thrust-type film cartridges and more particularly to cameras having a motor for advancing or rewinding the film, a film door through which film is inserted and removed and a door release.

2. Background of the Invention

Film is loaded into traditional cameras by moving a camera back aside, inserting a film cartridge into the camera body, threading the film onto a take up spool, advancing the film slightly onto the take up spool, closing the camera back and advancing the film to the first frame.

Recent camera art may provide for performance of some of these steps for the user. For example, in some automatic camera configurations, the user may simply open a film door, insert a film cartridge and then close the film door. An initialization sequence may then be performed which includes opening a light shielding door in the film cartridge, of the type described in commonly assigned U.S. Pat. No. 5,317,355, cinching the film to the take up spool, and advancing the film to the first frame.

A loading failure mode may however occur with this method. If the camera initialization sequence is begun before the film door is completely closed, then the film may be unintentionally exposed. To prevent this, recent cameras may have a sensor that detects closure of the film door.

Unfortunately, a single film door closed sensor can also be fooled. The user could begin to close the film door, thus triggering the film door closed switch, and then the user could release the film door before it latches, again exposing the film as the camera initialization sequence proceeds.

Alternatively, if a single sensor were located to sense movement of the door release instead of the film door itself, the same loading failure mode could occur. In this example, the user could push the film door closed just enough to move the door release towards a film door closed position, after which the user could let go of the film door without latching it. The door release position sensor could thus erroneously signal the camera to begin its initialization sequence.

A failure mode is also possible during unloading when a door closed sensor is used in combination with an automatic rewind feature. For example, if a camera has a sensor on the door release and the user moves the release while the motor is rewinding the film, the rewind sequence may be interrupted. Once interrupted, the camera needs a way of determining how to proceed next, i.e., to start rewinding again or await further user action. These problems have not been adequately addressed by the prior art.

An improved camera and operational method is therefore needed to prevent failures from occurring during the initialization and unloading operations of the camera.

SUMMARY OF THE INVENTION

It is a principal object of this invention to provide an improved automatic camera.

It is an additional object of this invention to provide a control system for an automatic camera which serves to prevent failures from occurring as a result of film exposure during initialization operations.

It is a further object of this invention to provide a control system for an automatic camera which serves to prevent failures from occurring as a result of film exposure during rewind operations.

A still further object of this invention is to provide a control system for an automatic camera which serves to prevent failures from occurring as a result of initialization operations beginning before film is properly loaded into the camera.

A yet further object of an embodiment of this invention is to provide a control system for an automatic camera which serves to selectively stop, re-start or terminate the rewind process upon interruption thereof by the user to prevent damage to the camera.

It is a further object of this invention to provide a control system for an automatic camera that is relatively inexpensive to manufacture while being reliable in operation.

According to this invention, a camera is provided that includes a door which is selectively movable between an open position and a closed position and a release which is movable between a home position and an away position for selectively retaining said door in said closed position. A door position sensor having at least two states is provided for determining the position of said door and a release position sensor having at least two states, is provided for determining the position of said release. The sensors are disposed within an electric circuit for allowing operation of the camera as a function of the states of the door position and release position sensors.

A primary advantage of the invention is that the camera will not initialize if the user accidentally starts to close the film door and releases it without completely closing the film door. In addition, the camera will not initialize if the user accidentally trips the door release when the film door is not closed. The camera also will not initialize until the film door is closed and the door release is in a closed position.

As an enhancement, the camera also will not initialize until a film cartridge is present in the film chamber of the camera. An additional advantage of this particular embodiment of the present invention is that if the user interrupts the rewind process, the motor is stopped to prevent damage to the camera, then, if a film cartridge is present, the rewind process continues, while if the film cartridge has been removed from the chamber, the rewind process is terminated.

The above and other objects and advantages of this invention will be more readily apparent from a reading of the following description of an exemplary embodiment thereof taken in conjunction with the following drawings.

DETAILED DESCRIPTION OF THE PREFERRED EMBODIMENT

The invention is preferably embodied in a photographic system that utilizes a thrust-type film cartridge. The invention, as shown, and described herein is embodied in a camera. Because the features of such a camera are generally well known, the description which follows is directed in particular to elements forming part of or cooperating directly with the disclosed embodiment of the invention. It is to be understood, however, that other elements not specifically shown or described may take various forms known to persons ordinarily skilled in the art.

Figure 7:
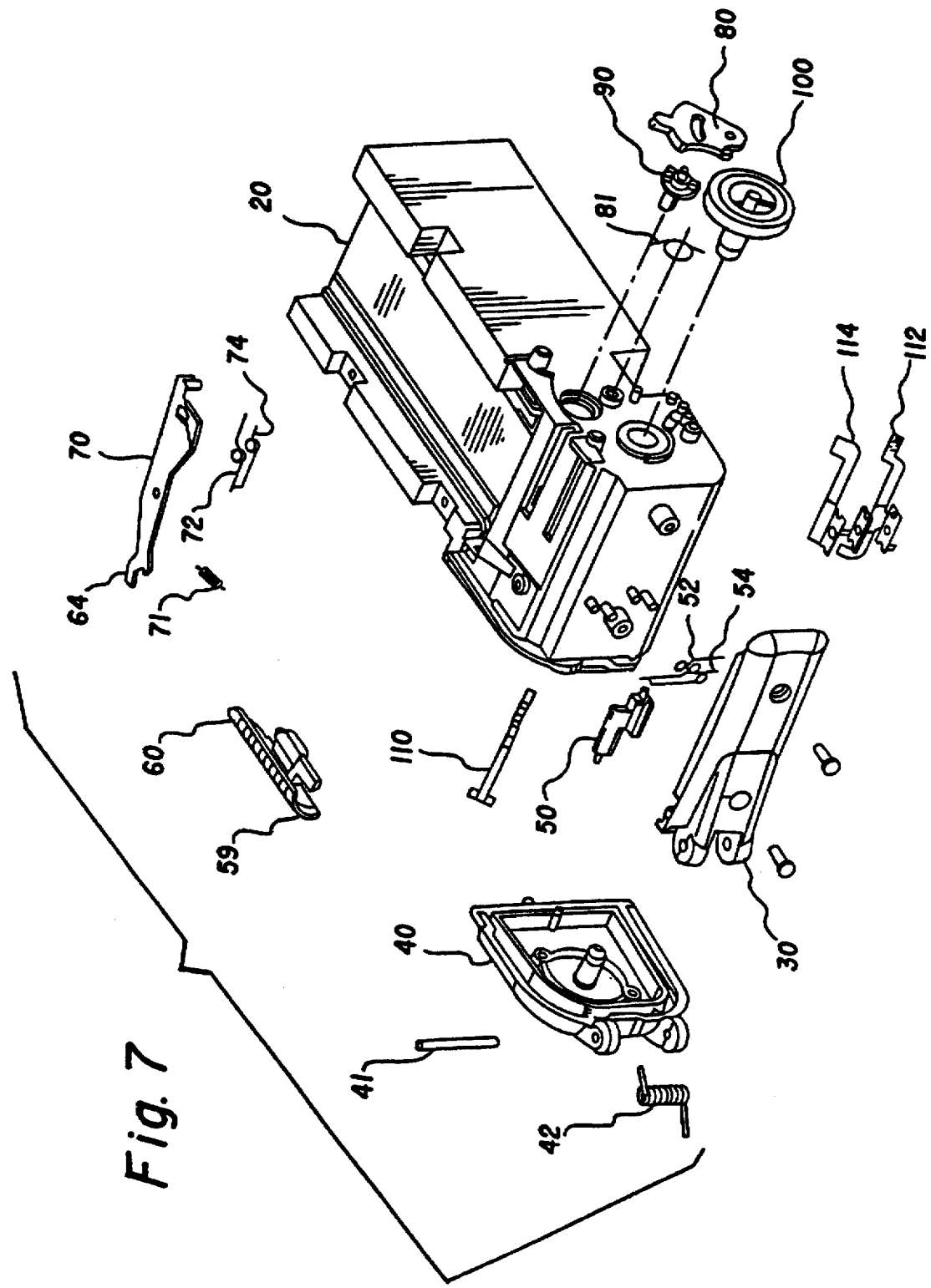
FIG. 7 is an exploded perspective view of a camera which embodies the present invention.

Referring to FIG. 7, a camera which embodies the present invention includes a camera body 20 and a film door 40 which is pivotably disposed thereon for admitting and retaining a film cartridge (not shown) within the camera body 20 in a manner known to one skilled in the art. A door release 60 is slidably disposed on the body 20 for selectively releasing the door 40 or maintaining the door in its closed position. The construction of the camera is discussed in greater detail hereinafter.

Figure 1:
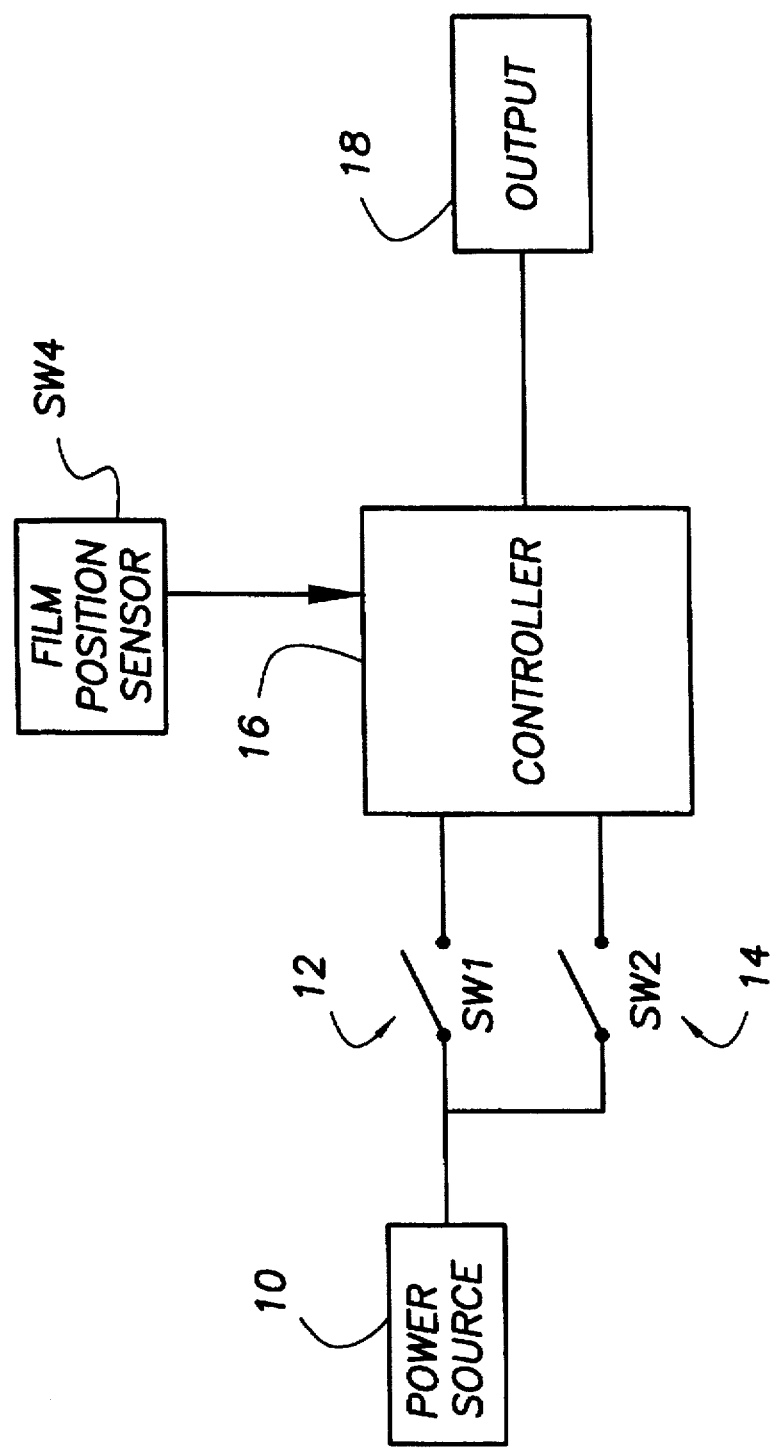
FIG. 1 is a schematic representation of a film cartridge loading sensor system of the present invention that includes two normally open switches in parallel, each of which are connected to an independent controller input.

Referring now to FIG. 1, in order to avoid a film loading failure during automatic loading of the film, an automatic camera in accordance with the present invention is provided with a film cartridge loading sensor system that includes at least two switches. These two switches can be located in any of several locations within the camera (FIG. 7). For example, a first switch 12 (FIG. 1) could sense the position of the film door 40 and a second switch 14 (FIG. 1) could sense the position of the door release 60. Other locations for switches include sensing the position of lever 70, sector drive 80, Active Light Lock (ALL) drive 90, or any other component that moves in tandem with the door 40 or release 60, as will be discussed hereinafter.

With the switch arrangement of the first example, a controller 16 monitors the state of both switches 12 and 14. In a preferred embodiment of this switch arrangement, as shown in FIGS. 7, 11 & 12-14, first switch 12 is embodied in film door closed sensor 48 (FIG. 11) which comprises a sensor arm 50 and first and second door sensor contacts 52 and 54, respectively. Second switch 14 is embodied in a door release position sensor which includes first and second release sensor contacts 72 and 74. The specific construction of this embodiment is as follows.

Figure 8:
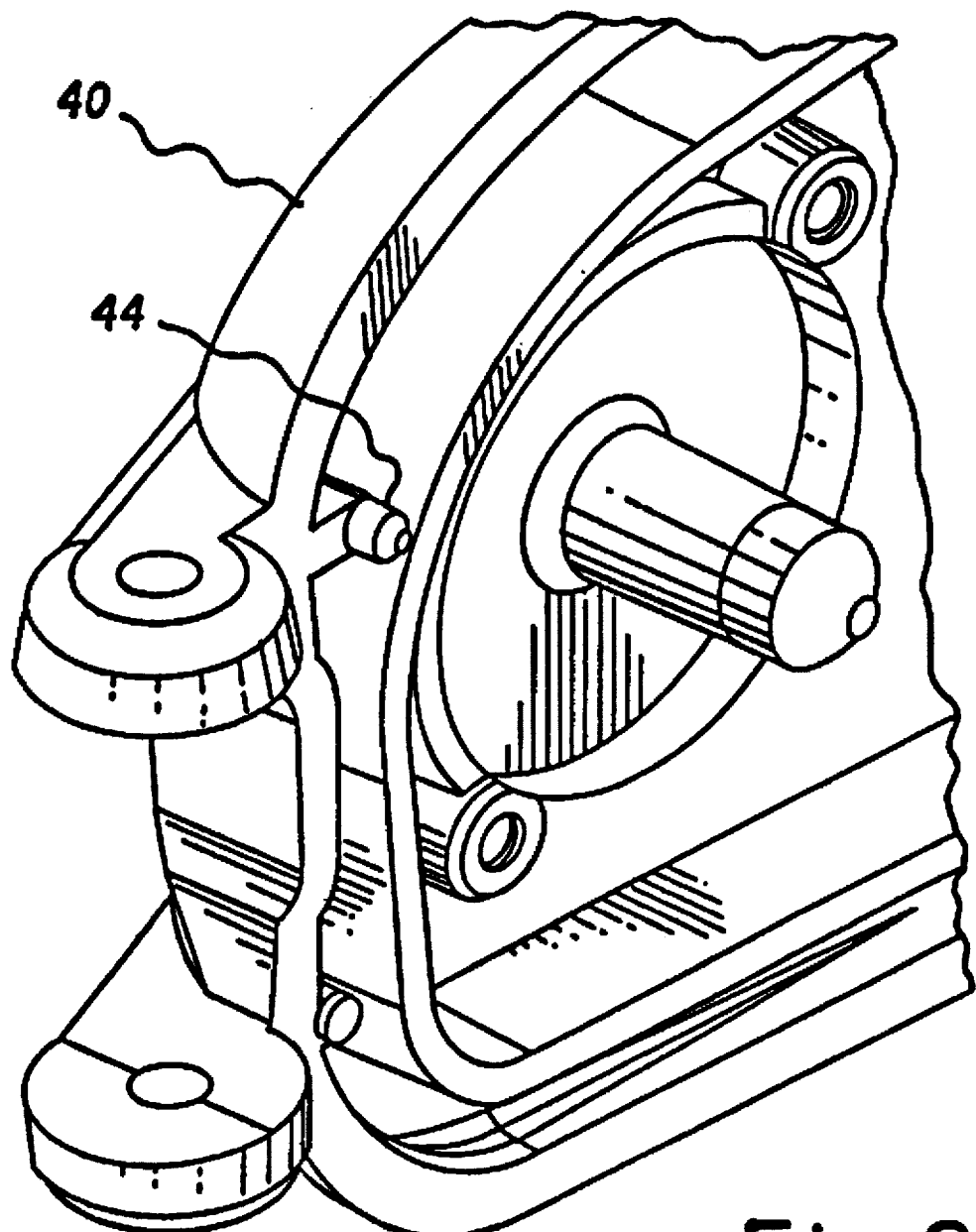
FIG. 8 is an enlarged perspective view of the film door of the camera of FIG. 7.
Figure 9:
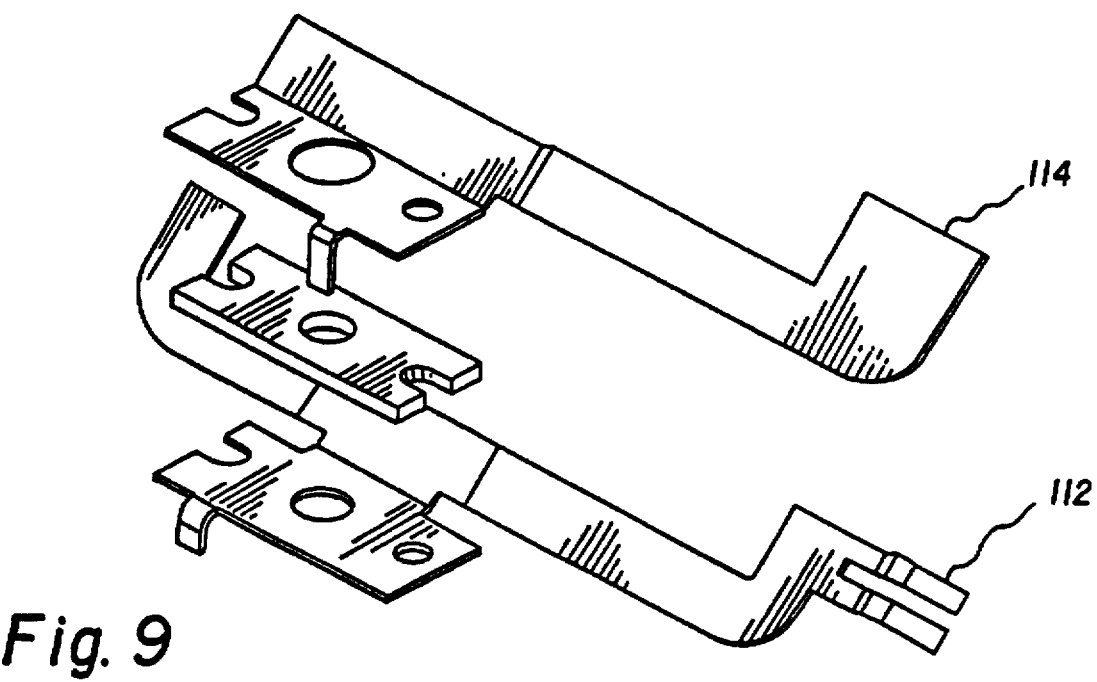
FIG. 9 is an enlarged perspective view of components of a Double Exposure Prevention (DEP) sensor switch of the camera of FIG. 7.
Figure 10:
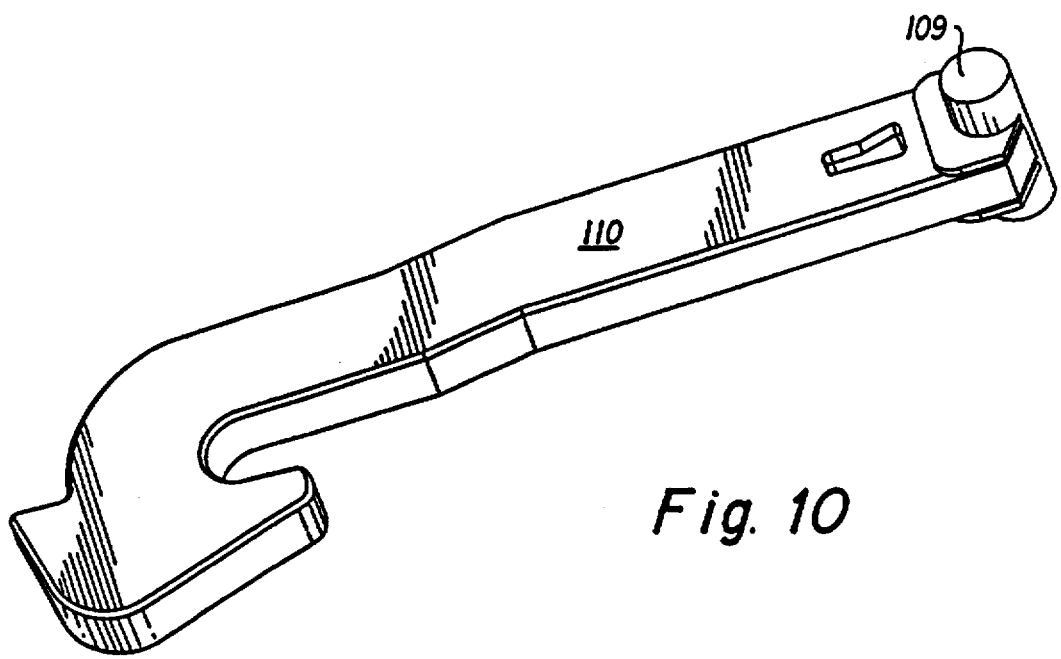
FIG. 10 is an enlarged perspective view of a component of a DEP sensor switch of the camera of FIG. 7.
Figure 11:
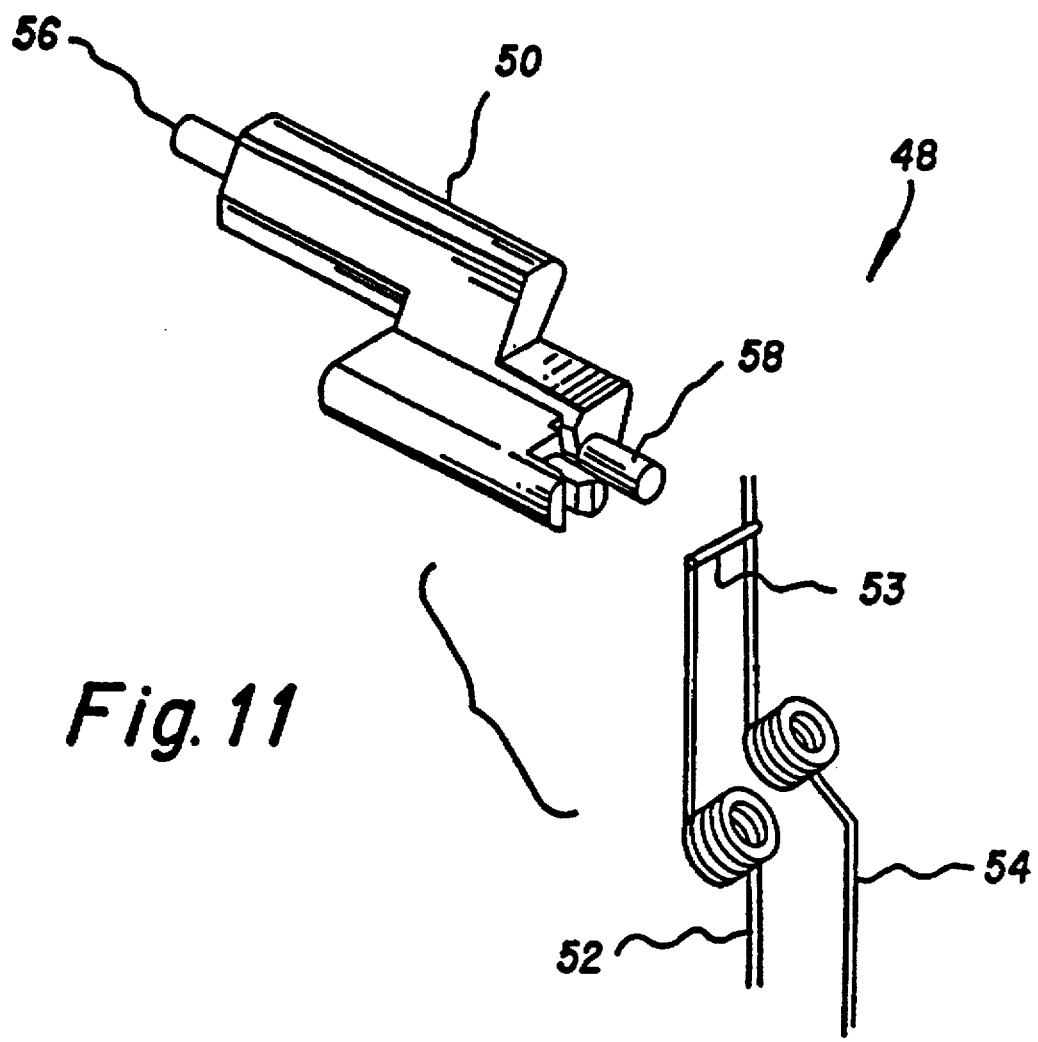
FIG. 11 is an enlarged perspective view of components of a film door closed sensor switch of the camera of FIG. 7.

As best shown in FIGS. 7 & 8, the film door 40 is pivotably fastened to the camera in a conventional manner by a hinge pin 41 disposed in the hinge 30. A biasing means such as a coil torsion spring 42 serves to bias the door towards its open position. As best shown in FIG. 8, the door includes a door sensor engagement post 44, which, when the door is in its closed position, is engageable with the door engaging end 56 (FIG. 11) of film door closed sensor arm 50. Referring now to FIG. 11, the door closed sensor arm 50 is generally longitudinal and comprises at its other end, a contact engaging end 58 which is engageable with first and second door sensor contacts 52 and 54 to alternately open and close the contacts. In this particular embodiment, the first door sensor contact 52 has an engagement end 53 that is disposed generally orthogonally to the remainder thereof as best shown in FIGS. 7 & 11.

Figure 12:
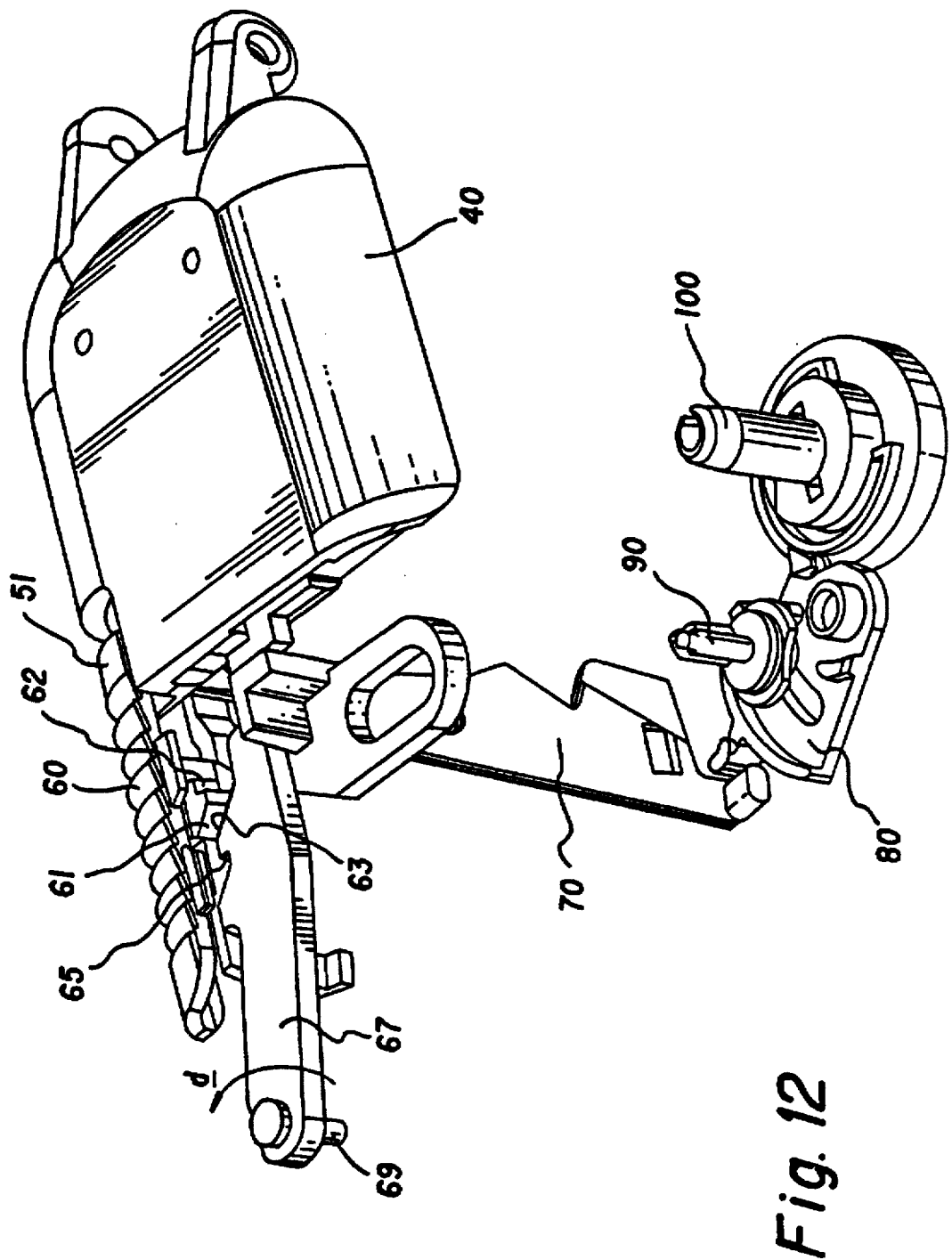
FIGS. 12-14 are enlarged perspective view of components of the camera of FIG. 7 at various steps in the operation thereof.
Figure 13:
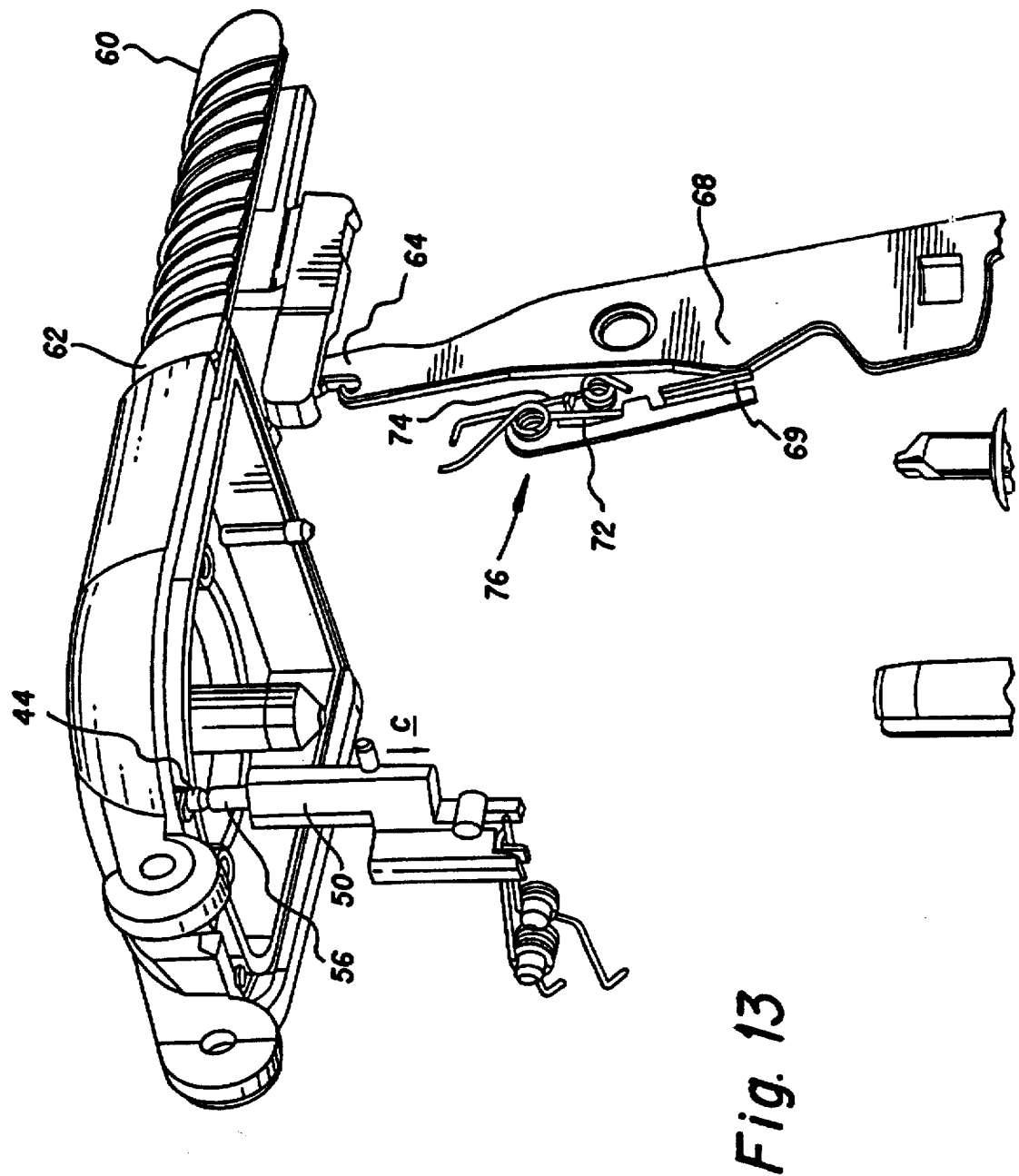
Figure 14:
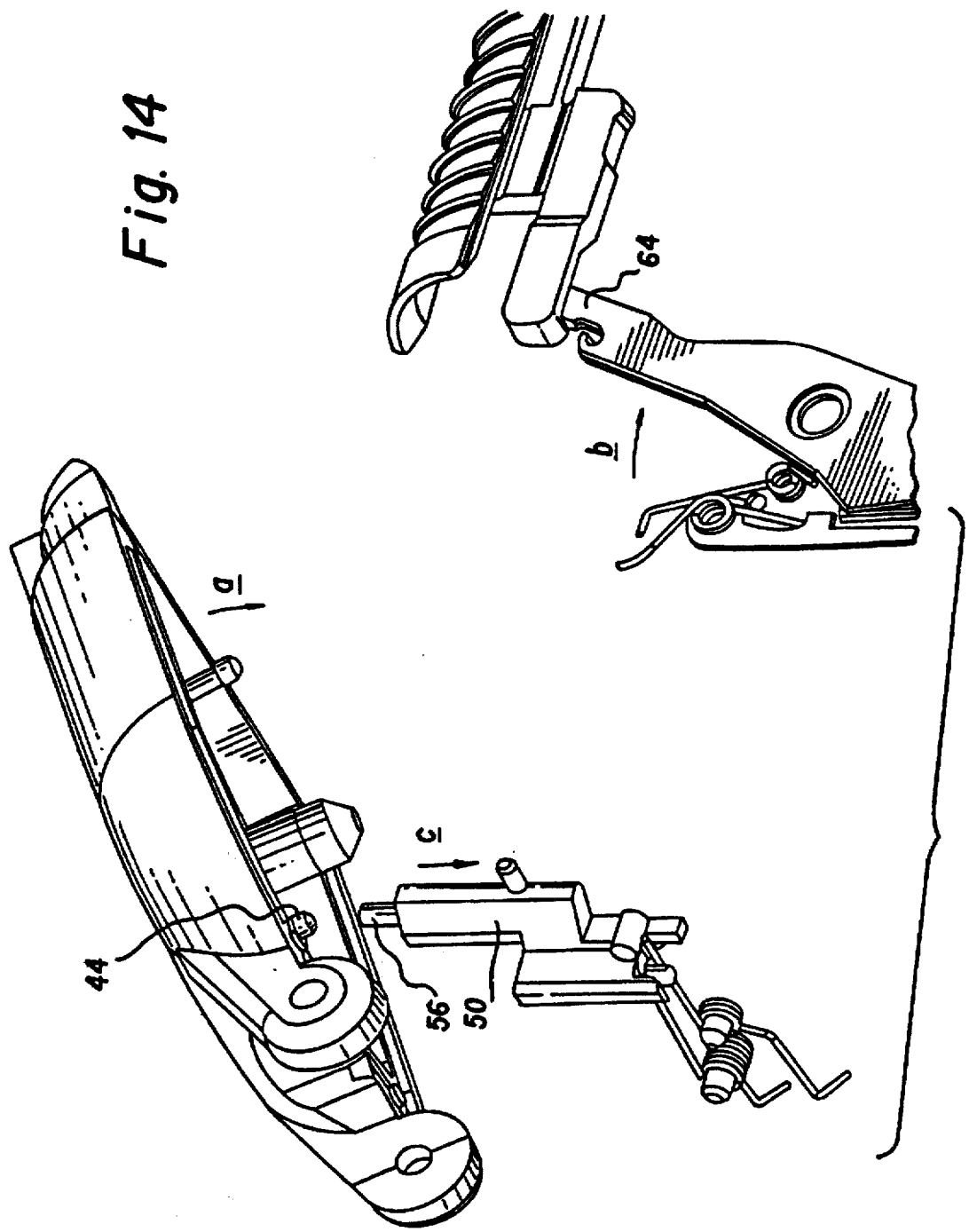

As shown in FIGS. 7 & 12-14, a door release 60 is slidably disposed in a conventional manner to the camera body 20. The release 60 is slidable in an axial direction selectively towards the door 40 into a closed or "home" position whereby an end 59 of the release may be disposed in superposed relationship over an edge of the door to retain the door in its closed position as shown in FIG. 12. Alternatively, the release 60 can be retracted from the door to an open or "away" position to permit the door to open as shown in FIG. 14. The release 60 further comprises a cam surface 61 and a catch 62 which cooperate with a cam follower surface 63 and detent 65, respectively, of a detent arm 67, to releasably maintain the release 60 in its away position when the door 60 is in its open position. The detent arm 67 is pivotally biased about pivot pin 69 in a direction indicated by arrow d in FIG. 12. The detent arm 67 is pivotable against the bias by a ramp (not shown) disposed on the film door 40 when the door is disposed in its closed position as shown in FIG.

As best shown in FIGS. 13 & 14, a nose 64 of a lever 70 is operatively engaged with the release 60. The lever 70 is pivotably disposed on the camera body 20 about a pin (not shown) disposed in the pivot hole 66. A biasing means, preferably a coil tension lever spring 71, is disposed between the camera body 20 and lever 70 to bias the lever 70, and consequently, the release 60, towards the door as shown in FIGS. 12 & 13, to facilitate retention of the door in its closed position. The lever further includes a cam 68 which is engageable with a cam follower 69 of a release sensor 76. The release sensor 76 further comprises first and second release sensor contacts 72 and 74, respectively, which open and close in response to movement of the cam follower 69. The contacts may be of any suitable configuration, including the type set forth hereinabove with respect to the contacts 52 and 54, or may preferably be of the type shown in FIGS. 13 and 14 in which first release sensor contact 72 is selectively engageable with the second release sensor contact 74.

As best shown in FIG. 12, the lever 70 further comprises a tail end 78 which is engageable with yoke or sector drive 80 which is in turn engageable with the ALL drive 90 in a manner set forth in our above-referenced commonly assigned U.S. Patent application Ser. No. 08/565,463.

The operation of this embodiment of the present invention is as follows. The user begins to load film into the camera by retracting the door release 60 from its home position (FIG. 13) to its away position (FIG. 14) to allow the film door 40 to be biased to its open position. As the release is so moved, its cam surface 61 engages cam follower surface 63 of the detent arm 67 to pivot the arm 67 against its bias in the direction opposite that indicated by arrow d. This pivoting will continue until the release 60 has reached its away position at which point the catch 62 will have cleared detent 65 of the pivot arm 67. The arm will then be biased in the direction of arrow d whereby the detent 65 will engage the catch 62 to maintain the release in its away position while the door 60 is open.

This movement of the door release 60 towards its away position also causes lever 70 to rotate in the direction indicated by arrow b (FIG. 14) into the position shown in FIG. 14. This movement of lever 70, in turn, causes sector drive 80 to engage ALL drive 90 as mentioned hereinabove.

Once the release 60 is disposed in the away position and the door 40 is open, the user then inserts a film cartridge into a film chamber of the camera. Referring now to FIGS. 13 & 14, the user begins to close film door 40 in the direction indicated by arrow a in FIG. 14. During closing, door sensor engagement post 44 presses against door engaging end 56 of film door closed sensor arm 50. As film door 40 continues to close, the film door closed sensor arm 50 moves in the direction indicated by arrow c of FIGS. 13 and 14 until, as shown in FIG. 13, contact engaging end 58 causes the engagement end 53 of the first door sensor contact 52 to engage the second door sensor contact 54, thus completing a portion of the circuit shown in FIG. 1.

Although in this embodiment, the contacts 52 and 54 are preferably closed by end 58, one skilled in the art will recognize that it is equally feasible to provide normally engaged first and second door sensor contacts 52 and 54 which are separated by contact engaging end 58 to break a portion of the circuit shown in FIG. 1.

Furthermore, as the door 40 reaches its closed position, the ramp (not shown) will pivot the detent arm 67 against its bias to disengage the catch 62 from the detent 65. Accordingly, the release 60 will be biased towards its home position to retain the door 40 in its closed position. As lever 70 moves in cooperation with the release 60, the cam follower 69 of release sensor 76 follows cam 68 of the lever 70. Continued movement causes first lever sensor contact 72 to move towards the second lever sensor contact 74, until contact is made, thus completing a portion of the circuit shown in FIG. 1. As with the film door closed sensor, it is also feasible to have normally engaged first and second lever sensor contacts 72 and 74 which are separated by the lever 70 to break a portion of the circuit shown in FIG. 1.

Referring now to FIG. 1, when the state of first switch 12, as embodied by film door closed sensor 48, changes, controller 16 determines if there has been a change in the state of second switch 14, as embodied by release position sensor 76. Table 1 shows the relationship of various stages of the loading sequence and the states of first and second switches 12 and 14.

TABLE 1

| STATE | FILM DOOR POSITION | DOOR RELEASE POSITION | SW1 STATE | SW2 STATE |
|---|---|---|---|---|
| Load film cartridge in film chamber | open | open (detent) | open | open |
| Begin to close film door | open | open (detent) | open | open |
| Film door engages film door closed sensor (SW1) | closed | open (detent) | closed | open |
| Film door engages door release; door release moves from detent to open position | closed | open | closed | open |
| Film door closed; door release in closed position; lever engages door release position sensor (SW2) | closed | closed | closed | closed |

If the user should incompletely close film door 40, then door release 60 will not be able to move to the closed or home position and the state of second switch 14, embodied in door release sensor 76, will not change. The controller 16 will not allow the camera to initialize until both first and second switches 12 and 14 have changed state. As mentioned hereinabove, this circuitry implementation will also work properly if first and second switches 12 & 14 change from closed states to open states, rather than open to closed states.

Figure 2:
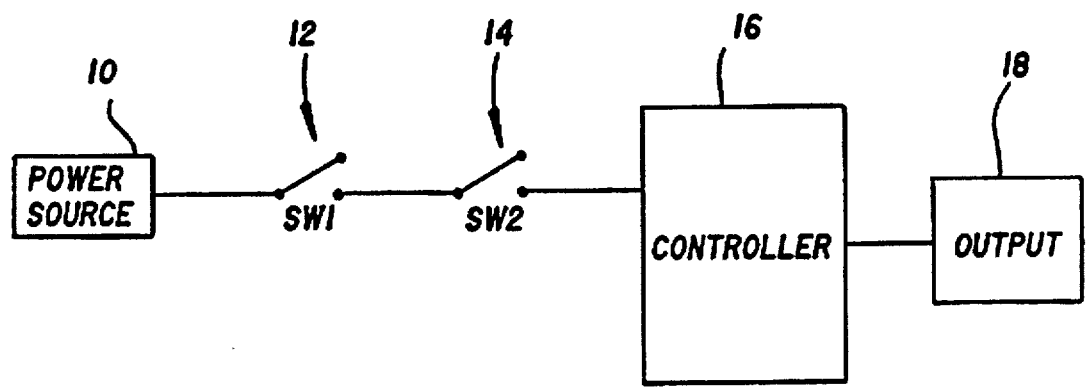
FIG. 2 is a view similar to that of FIG. 1, of an embodiment of the present invention having two switches in series.

Another implementation of circuitry is shown in FIG. 2, where first and second switches 12 and 14 are disposed in series. The operation is the same as with FIG. 1, and as set forth in Table 1, except that this implementation only works when first and second switches 12 and 14 change from an open state to a closed state in response to the door and release moving to their closed and home positions, respectively.

Figure 4:
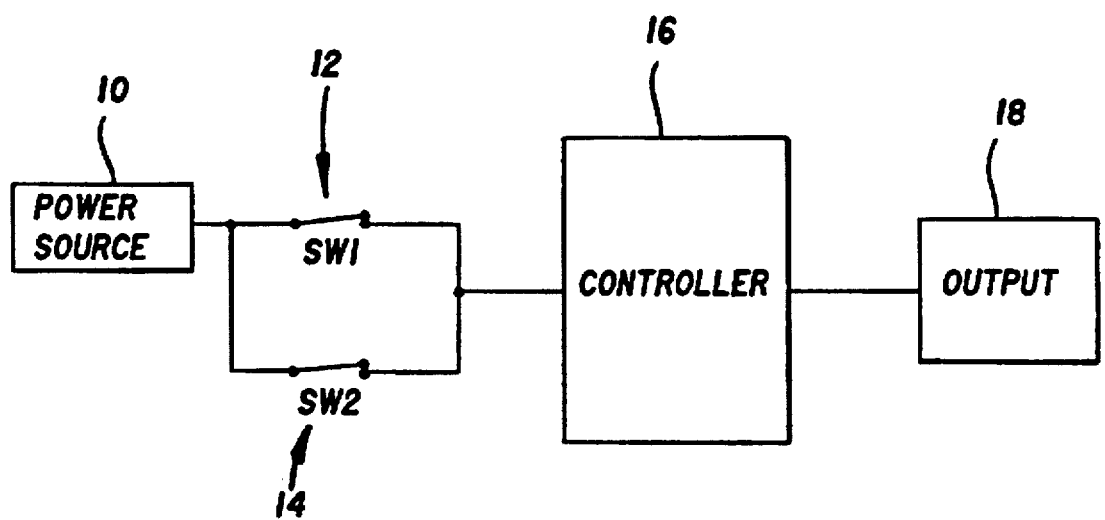
FIG. 4 is a view similar to that of FIGS. 1-3, of a yet further embodiment having two normally closed switches disposed in parallel, each being connected to a common controller input.

Yet another embodiment of a circuit is shown in FIG. 4, where two normally closed switches 12 & 14 are disposed in parallel, using only one input to controller 16. The operation of the switches for this circuit embodiment is the opposite of that for FIG. 1, as shown by the stages of the loading sequence and the states of first and second switches 12 and 14 as set forth in Table 2. The advantage of this embodiment over that shown in FIG. 1 is that only one input to the controller is needed. Note that this implementation only works when first and second switches 12 & 14 change from a closed state to an open state in response to movement of the door and release to their closed and home positions, respectively.

TABLE 2

| STATE | FILM DOOR POSITION | DOOR RELEASE POSITION | SW1 STATE | SW2 STATE |
|---|---|---|---|---|
| Load film cartridge in film chamber | open | open (detent | closed | closed |
| Begin to close film door | open | open (detent) | closed | closed |
| Film door engages film door closed sensor (SW1) | closed | open (detent) | open | closed |
| Film door engages door release; door release moves from | closed | open | open | closed |

TABLE 2-continued

| STATE | FILM DOOR POSITION | DOOR RELEASE POSITION | SW1 STATE | SW2 STATE |
|---|---|---|---|---|
| detent to open position Film door closed; door release in closed position; lever engages door release position sensor (SW2) | closed | closed | open | open |

A further, embodiment of the present invention, in addition to the above described benefits, provides the additional benefit of preventing a loading failure which may occur if the user were to open the camera's film door 40 and then close the door without inserting any film in the film chamber. This preferred embodiment comprises essentially the same components as heretofore described, with the addition of the following new components. Accordingly, where previously described components are mentioned hereinafter, the same reference numerals will be used.

Figure 3A:
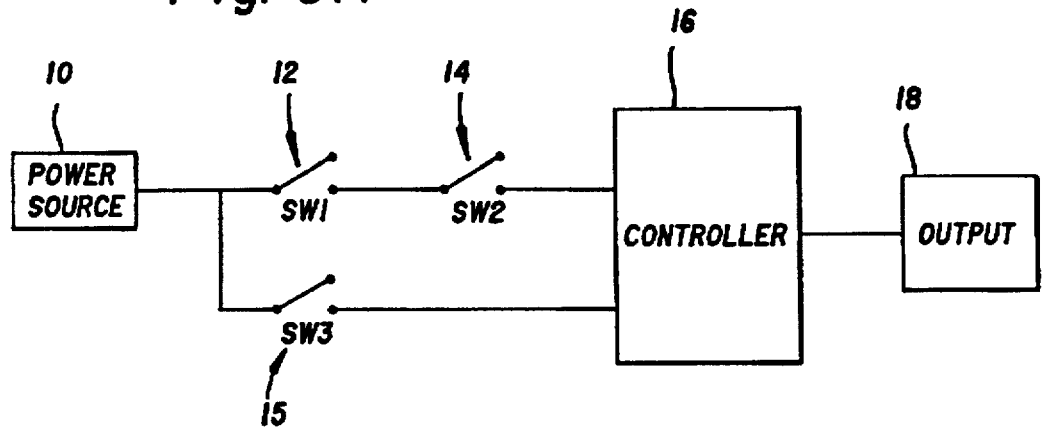
FIG. 3A is a view similar to that of FIGS. 1 & 2, of an embodiment having three switches, two of which are in series.

A circuit which may preferably be employed in conjunction with this embodiment is shown in FIG. 3A and includes three switches two of which (12 and 14) are in series to one input of the controller, and a third of which (15) is connected to another input to the controller. First and second switches 12 & 14 are preferably sensors 48 and 76 as set forth in the embodiment described hereinabove. Since first and second switches 12 & 14 are in series, when first switch 12 and second switch 14 are closed, the controller 16 knows that film door 40 is closed and door release 60 is in the home position. A third switch 15 is disposed to detect the presence of a film cartridge in the camera.

Referring now to FIGS. 7, 9, 10 & 12, third switch 15 is embodied in this embodiment by a Double Exposure Prevention (DEP) sensor of the type set forth in our above-referenced U.S. Patent applications Ser. Nos. 386,792 and 385,291. The DEP sensor comprises a DEP hook 110 and first and second DEP contacts 112 and 114. As set forth in the above-referenced applications, the DEP hook 110 is pivotally disposed on the camera body 20 by a pivot pin 109 to alternately open and close the contacts 112 and 114. Briefly described, the operation of the DEP sensor is as follows. When a film cartridge having at least some portion of unexposed film is loaded into the film chamber, the hook 110 pivots from a no cartridge present position to a cartridge present position. In a preferred embodiment, when DEP hook 110 is in the no cartridge present position, DEP sensor is said to be in a closed state where first DEP sensor contact 112 engages second DEP sensor contact 114. When the DEP sensor moves to a cartridge present position, it is disposed in an open state where first DEP sensor contact 112 is disengaged from second DEP sensor contact 114. However, it should be recognized by one skilled in the art, that it would be possible to design third switch 15 to change from an open state to a closed state and still have the controller logic function properly.

Figure 3B:
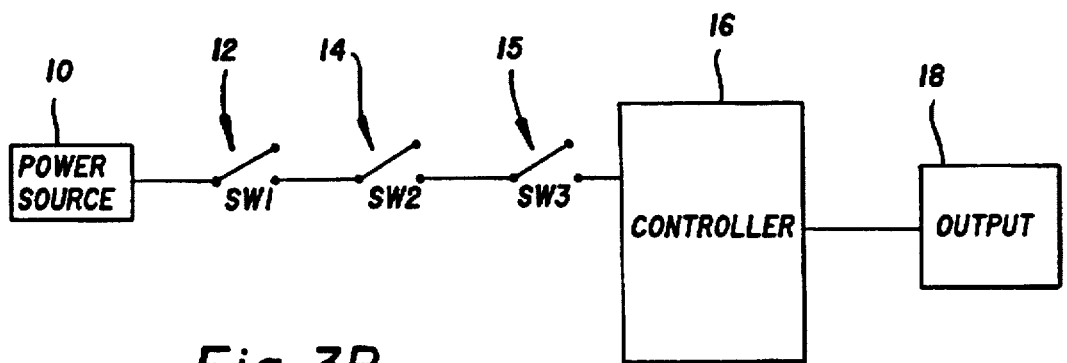
FIG. 3B is a view similar to that of FIG. 3A of an embodiment having three switches in series.
Figure 3C:
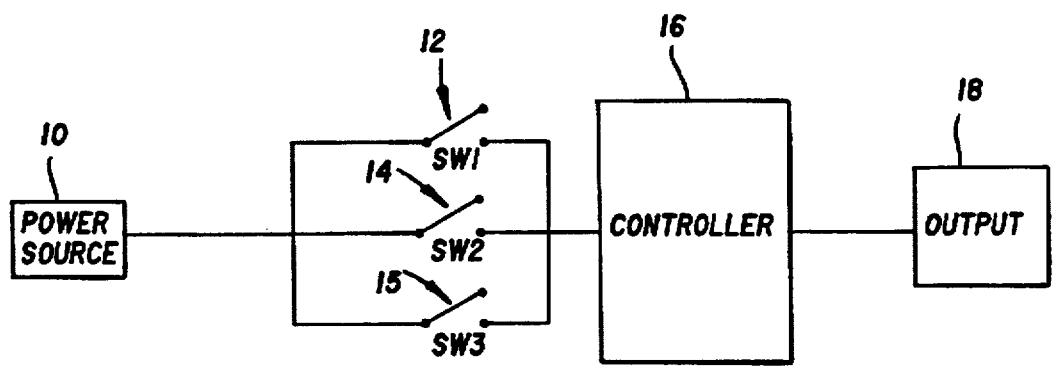
FIG. 3C is a view similar to that of FIG. 3B of an embodiment having three switches disposed in parallel to one another, each being connected to a common controller input.

Further embodiments of the invention may include disposing all three switches 12, 14 and 15 in series, as shown in FIG. 3B, or in parallel, as shown in FIG. 3C.

A preferred embodiment of the invention having been fully described, the following is a description of the operation thereof.

Figure 5:
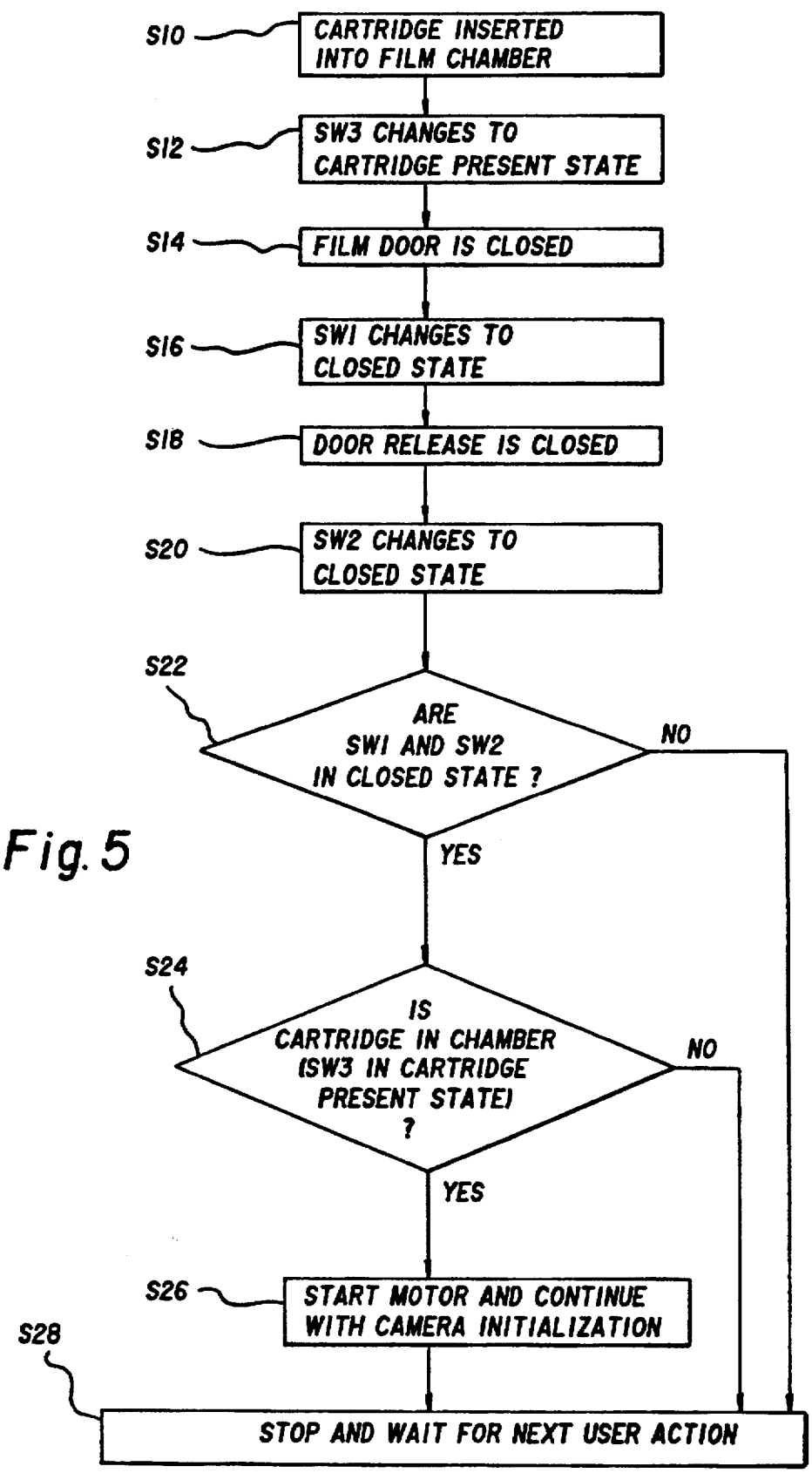
FIG. 5 is a function block diagram for a method of loading a film cartridge into a camera pursuant to the present invention.

The operation of this preferred embodiment is a combination of the embodiments described hereinabove and is set forth in the function block diagram of FIG. 5. Specifically, referring to FIG. 5, the controller determines S22, whether the door closed sensor 48 (SW1, first switch 12) and the door release sensor 76 (SW2, second switch 14) are closed. The controller then determines S24 the state of the DEP sensor (SW3, third switch 15). The DEP sensor changes state when a film cartridge is present; thus if the DEP sensor has changed state when the other two switches 12 and 14 have closed, the controller will begin a camera initialization sequence. However, if no film cartridge is present, the controller will not begin camera initialization even though the film door and door release are closed. This loading process is shown by the states of the switches as set forth in Table 3.

It will be apparent that if any of the switches change state after initialization has begun, for example, as the result of the user moving the release and opening the film door, the initialization sequence will generally be terminated. However, in a preferred embodiment, a film position sensor SW4 may be provided to determine whether the film is disposed in the film plane (not shown) of the camera. The film plane will be recognized by one skilled in the art as the location in the camera where the film is imprinted with a photographic image. In this preferred embodiment, the sequence will not be terminated once the film has been advanced into the film plane (not shown), at which point film door 40 will be maintained in its closed position by an interlock (not shown).

TABLE 3

| STATE | FILM DOOR POSITION | DOOR RELEASE POSITION | DEP SENSOR POSITION | SW1 STATE | SW2 STATE | SW3 STATE |
|---|---|---|---|---|---|---|
| Load film cartridge in film chamber | open | open (detent) | no cartridge present | open | open | closed |
| Begin to close film door | open | open (detent) | cartridge present | open | open | open |
| Film door engages film closed sensor (SW1) | closed | open | cartridge present | closed | open | open |
| Film door engages door release; door release moves from detent to open position | closed | open | cartridge present | closed | open | open |

TABLE 3-continued

| STATE | FILM DOOR POSITION | DOOR RELEASE POSITION | DEP SENSOR POSITION | SW1 STATE | SW2 STATE | SW3 STATE |
|---|---|---|---|---|---|---|
| Film door closed; door release in closed position; lever engages door release position sensor (SW2) | closed | closed | cartridge present | closed | closed | open |

Figure 6:
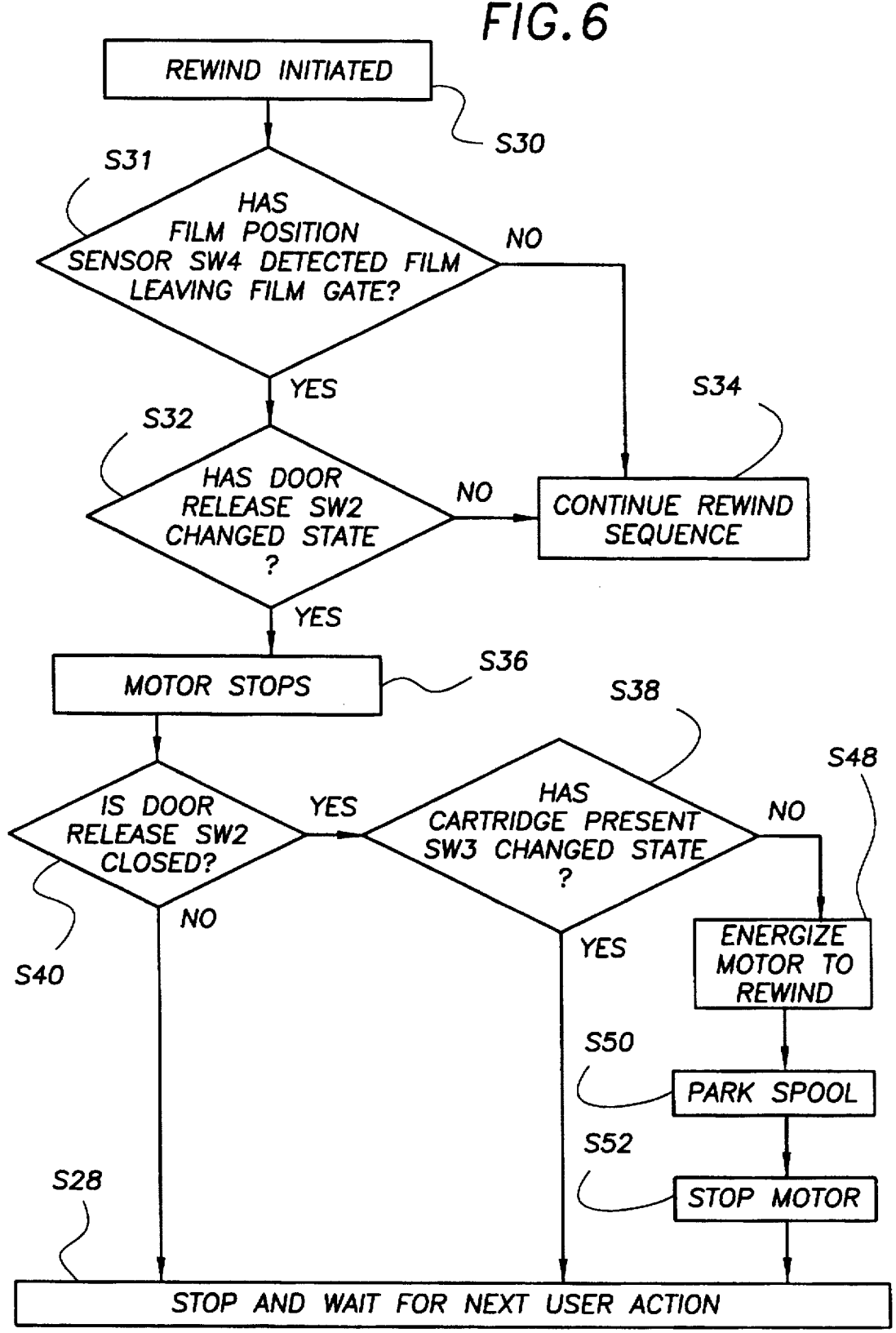
FIG. 6 is a function block diagram for a method of unloading a film cartridge from a camera pursuant to the present invention.

The three switch embodiment shown in FIG. 3 and described in Table 3 provides a solution to an unloading failure which may occur if a user interrupts the rewind process and then removes the film cartridge. In a manner similar to that discussed hereinabove with regard to the initialization sequence, in a preferred embodiment, the rewind operation will be substantially uninterruptable as long as the film position sensor indicates that film is disposed in the film plane of the camera (Step S31 of FIG. 6). Accordingly, referring now to the function block diagram of the unloading process of FIG. 6, if a user moves S32 the door release 60 while film is being rewound into the film cartridge, and while the film is in the film plane, the aforementioned interlock (not shown) will prevent the film door from opening and the rewind operation will continue. Once the film has left the film plane, the camera motor is stopped S36 to prevent damage to the film drive mechanism. Controller 16 then determines S40 if door release 60 has returned to a home or closed position. If the user has opened film door 40 and removed the film cartridge, then the door release 60 will not return to the home position until film door 40 is closed.

In the alternative, the user may have simply moved the door release 60 slightly and then allowed it to return to the home position without opening the film door 40. If this occurs while the film is in the plane, as mentioned hereinabove, the rewind process will be uninterrupted. If, however, the film has cleared the film plane, the motor will stop until door release 60 returns to its home position.

The controller 16 then determines S38 if the state of the DEP sensor (SW3) has changed i.e., the cartridge has been removed. If there has been no change in the state of SW3 and door 40 is closed, the controller 16 will continue the rewind operation by energizing the motor S48, parking the spool S50 and stopping the motor S52.

It is also possible the user changed film cartridges during the interruption, thus causing the state of DEP sensor (SW3) to change. If this happens, controller 16 terminates S28 the rewind operation and awaits the next user action.

It should be recognized by one skilled in the art that although the door release sensor 76 has been disclosed as being in operative engagement with the lever 70, sensor 76 may be disposed in operative engagement with the release 60, or any of the components such as the sector drive 80 or ALL drive 90 that move in tandem with the door release 60, in order to monitor the position of door release 60, and remain within the scope of the present invention.

In addition, although the door closed sensor 48 is disclosed as being in operative engagement with the film door, it should be recognized by one skilled in the art that the sensor 48 may be disposed in operative engagement with any camera component that moves in cooperation or in tandem with the film door and still remain within the scope of the present invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Parts List for FIGS. 1–14

10 power source
12 first switch (SW1)
14 second switch (SW2)
15 third switch (SW3)
16 controller
18 output
20 camera body
30 hinge
40 film door
41 hinge pin
42 film door spring
44 door sensor engagement post
48 film door closed sensor
50 film door closed sensor arm
52 first door sensor contact
53 engagement end of first door sensor contact
54 second door sensor contact
56 door engaging end of film door closed sensor
58 contact engaging end of film door closed sensor
59 end of release
60 door release
61 cam surface
62 catch
63 cam follower surface
64 nose of lever
65 detent
66 pivot hole of lever
67 detent arm
68 cam
69 cam follower
70 lever
71 lever spring
72 first release sensor contact
74 second release sensor contact
76 release sensor
78 tail end
80 sector drive 81 sector drive spring
90 ALL drive
100 film drive
109 pivot pin
110 DEP hook member
111 engagement end of DEP sensor
112 first DEP sensor contact
114 second DEP sensor contact

Having thus described my invention, what is claimed is:

1. A camera comprising:
   a door selectively movable between an open position and a closed position;
   a release selectively movable between a home position for retaining said door in said closed position and an away position for releasing said door;
   a door position sensor having at least two states, for determining the position of said door;
   a release position sensor having at least two states, for determining the position of said release;
   said door position and release position sensors being disposed within an electric circuit for allowing operation of the camera only when said door position sensor is disposed in a state corresponding to said door being closed and said release position sensor is disposed in a state corresponding to said release being in said home position;
   a film position sensor for determining whether the film is disposed in a film plane of the camera for maintaining operation of the camera uninterruptable by said electric circuit as long as the film position sensor indicates that film is disposed in said film plane;
   a film sensor having at least two states, for determining presence of film in the camera, said film sensor being disposed within said electric circuit for allowing operation of the camera as a function of the state of said film sensor;
   wherein said electric circuit allows operation of the camera only when said door position sensor is disposed in a state corresponding to said door being closed, said release position sensor is disposed in a state corresponding to said release being in said home position and said film sensor is disposed in a state corresponding to film being present in the camera; and
   wherein said film position sensor maintains operation of the camera even if said door position sensor is moved to a state corresponding to said door being in said open position while said film is disposed in the film plane.

2. The camera of claim 1, wherein said door position sensor includes means for determining the position of said door by sensing position of a camera component which moves in tandem with said door.

3. The camera of claim 1, wherein said release position sensor includes means for determining the position of said release by sensing position of a camera component which moves in tandem with said release.

4. The camera of claim 3, wherein said release operatively engages a lever which moves in tandem with said release, and said release position sensor comprises a switch which is operatively engaged with said lever.

5. The camera of claim 4, wherein said electric circuit comprises said switches, a power source and an output device.

6. The camera of claim 5, wherein said output device comprises a motor which actuates said film.

7. The camera of claim 5, wherein said door position switch and said release position switch are disposed in series with one another and in parallel with said film switch within said electric circuit.

8. The camera of claim 5, wherein said electric circuit further comprises a controller for controlling operation of the camera.

9. The camera of claim 8, wherein said door position switch and said release position switch are disposed in series with one another to an input at said controller and in parallel with said film switch which is connected to an other input of said controller.

10. The camera of claim 1, wherein said film sensor determines the presence of the film by sensing position of a camera component which moves in response to presence of the film.

11. The camera of claim 1, wherein said door position, release position and film sensors comprise switches.

12. The camera of claim 11, wherein said film switch comprises a double exposure prevention switch.

13. A camera comprising:
   a door selectively movable between an open position and a closed position;
   a release selectively movable between a home position for retaining said door in said closed position and an away position for releasing said door;
   a door position sensor having at least two states, for determining the position of said door;
   a release position sensor having at least two states, for determining the position of said release;
   said door position and release position sensors being disposed within an electric circuit for allowing operation of the camera only when said door position sensor is disposed in a state corresponding to said door being closed and said release position sensor is disposed in a state corresponding to said release being in said home position;
   a film position sensor for determining whether the film is disposed in a film plane of the camera for maintaining operation of the camera uninterruptable by said electric circuit as long as the film position sensor indicates that film is disposed in said film plane;
   a film sensor having at least two states, for determining presence of film in the camera, said film sensor being disposed within said electric circuit for allowing operation of the camera as a function of the state of said film sensor;
   wherein said electric circuit allows operation of the camera only when said door position sensor is disposed in a state corresponding to said door being closed, said release position sensor is disposed in a state corresponding to said release being in said home position and said film sensor is disposed in a state corresponding to film being present in the camera; and
   wherein said film position sensor maintains operation of the camera if said release position sensor is moved to a state corresponding to said release being in said away position while said film is disposed in the film plane.

14. A camera comprising:
   a motor for effecting movement of film disposed in the camera;
   a door selectively movable between an open position and a closed position for admitting and retaining the film in the camera;
   a release movable between a home position and an away position for selectively retaining said door in said closed position;

a door position sensor having at least two states, for determining the position of said door;

a release position sensor separate from said door position sensor, said release position sensor having at least two states, for determining the position of said release;

a circuit for energizing said motor as a function of the states of said door position and release position sensors a film position sensor for determining presence of the film in a film plane of the camera for continuing operation of said motor while said film is disposed in the film plane;

wherein said circuit allows operation of said motor only when said door position sensor is disposed in a state corresponding to said door being closed, and said release position sensor is disposed in a state corresponding to said release being in said home position; and wherein said film position sensor maintains operation of the motor while said film is disposed in said film plane even if said door position sensor is moved to a state corresponding to said door being in said open position or said release position sensor is moved to a state corresponding to said release being in said away position.

15. A method of operation of a camera having a door which is selectively movable from an open to a closed position and a release movable between a home position and an away position for selectively retaining said door in said closed position, comprising the steps of:

(a) sensing the presence of film in the camera;

(b) sensing the position of said door;

(c) independently sensing the position of said release; and (d) if film is present in the camera, said door is disposed in its closed position and said release is disposed in its home position, allowing operation of the camera;

wherein said camera further comprises a motor for actuating the film within the camera, a door position sensor having at least two states for determining the position of said door, a release position sensor, separate from said door position sensor, said release position sensor having at least two states for determining the position of said release, a film sensor having at least two states for determining presence of film in the camera and said sensors being disposed within an electric circuit for allowing operation of the camera as a function of the states of said sensors and wherein said sensing step (a) comprises sensing the state of said film sensor; said sensing step (b) comprises sensing the state of said door position sensor; and said sensing step (c) comprises sensing the state of said release position sensor; and further comprising the steps of sensing presence of the film in a film plane of the camera and continuing operation of the camera while the film is disposed in said film plane even if said door position sensor is moved to a state corresponding to said door being in said open position or said release position sensor is moved to a state corresponding to said release being in said away position.

16. The method of operation of claim 15, further comprising:

(f) energizing the motor to rewind the film upon exposure of at least a portion of the film if said door position, release position and film sensors are disposed in an appropriate state;

(g) during said step (f), determining whether said release position sensor has changed state and if said release position has changed state, then de-energizing the motor.

17. The method of operation of claim 16, further comprising the steps of:

(h) determining whether said release position sensor has returned to its home state and if not, waiting for a predetermined time period then rechecking whether said release position sensor has returned to its home state;

(i) if said release position sensor has returned to its home state, determining whether the film sensor has changed state;

(j) if said film sensor has not changed state, then re-energizing the motor to continue rewinding the film.

* * * * *